No. 660,192. Patented Oct. 23, 1900.
R. JACKSON.
SELF PROPELLED VEHICLE.
(Application filed June 4, 1900.)
(No Model.) 3 Sheets—Sheet 1.

WITNESSES:
D. M. Thomson
S. J. Thomson Jr

INVENTOR
Ralph Jackson
By James A. Cowbrough
Attorney

No. 660,192. Patented Oct. 23, 1900.
R. JACKSON.
SELF PROPELLED VEHICLE.
(Application filed June 4, 1900.)
(No Model.) 3 Sheets—Sheet 3.

WITNESSES.
D. M. Thomson
S. J. Thomson Jr

INVENTOR
Ralph Jackson
By James A. Coubrough
Attorney

UNITED STATES PATENT OFFICE.

RALPH JACKSON, OF ALTRINCHAM, ENGLAND.

SELF-PROPELLED VEHICLE.

SPECIFICATION forming part of Letters Patent No. 660,192, dated October 23, 1900.

Application filed June 4, 1900. Serial No. 19,031. (No model.)

*To all whom it may concern:*

Be it known that I, RALPH JACKSON, a subject of the Queen of Great Britain and Ireland, and a resident of Altrincham, England, (whose post-office address is the Motor Cycle Works, Altrincham,) have invented a certain new and useful Improvement in Self-Propelled Road-Vehicles, (for which I have applied for patent in Great Britain, No. 17,902, dated September 5, 1899,) of which the following is a specification.

This invention relates to certain improvements in the construction of self-propelled road-vehicles.

Figure 1:
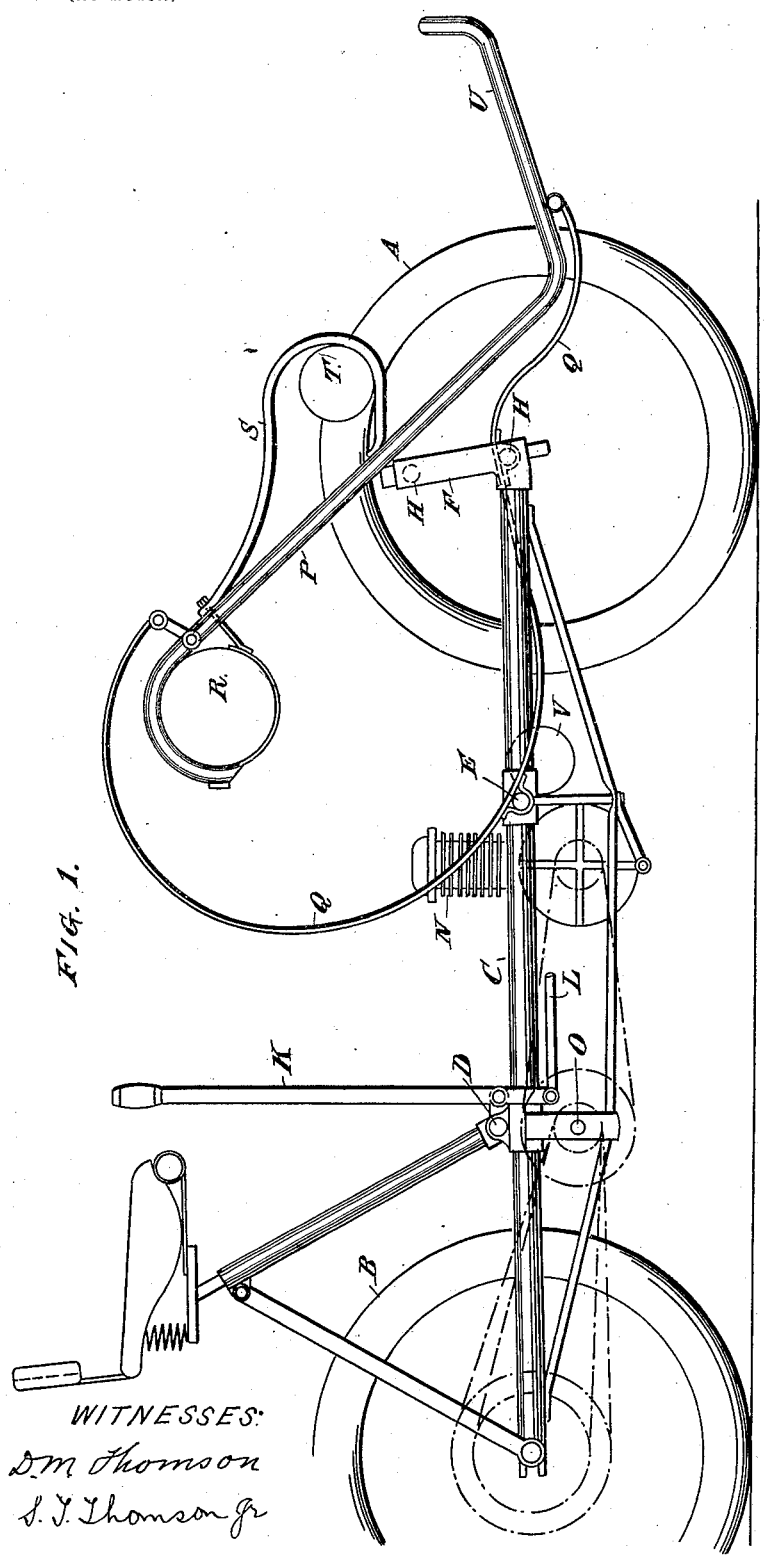
Figure 2:
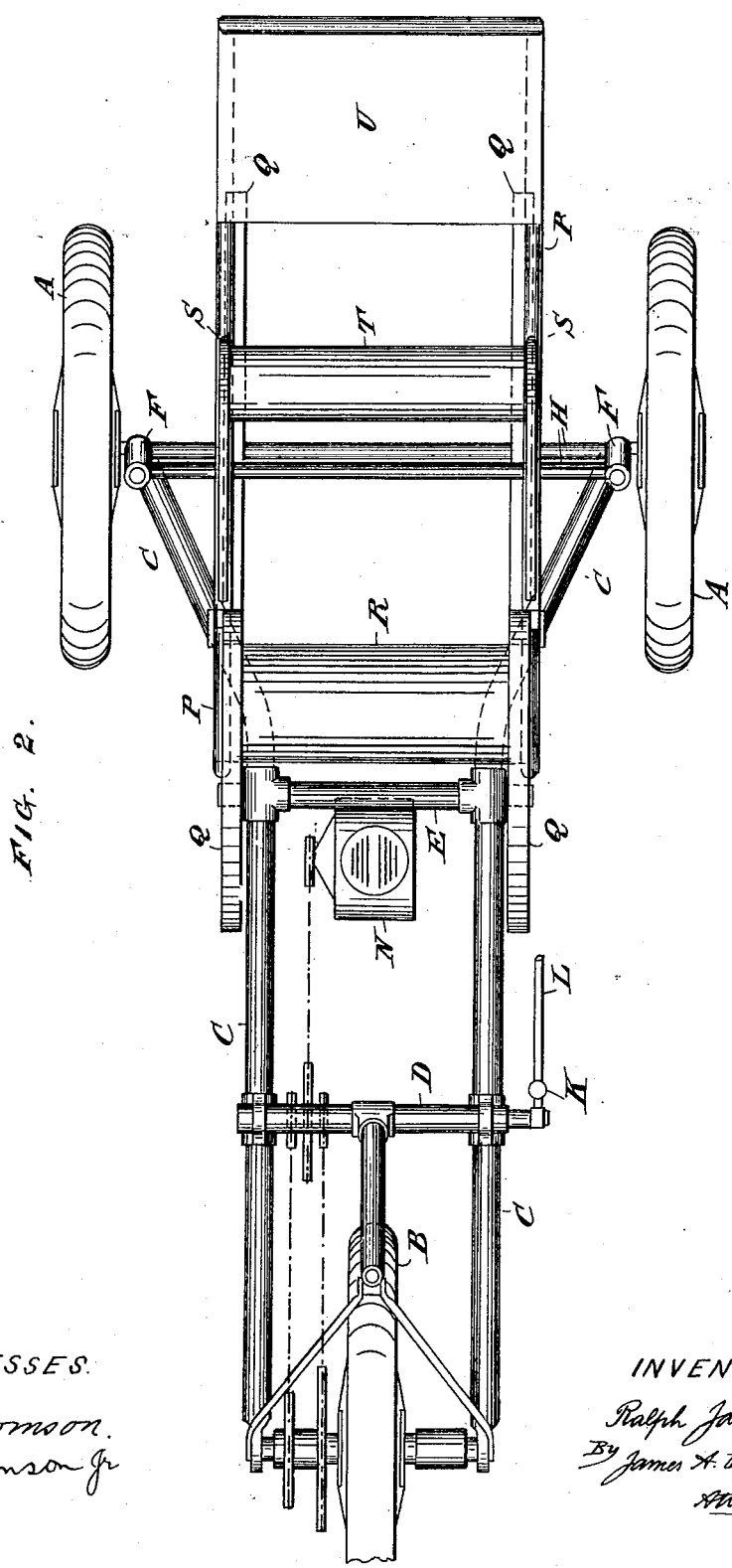
Figure 3:
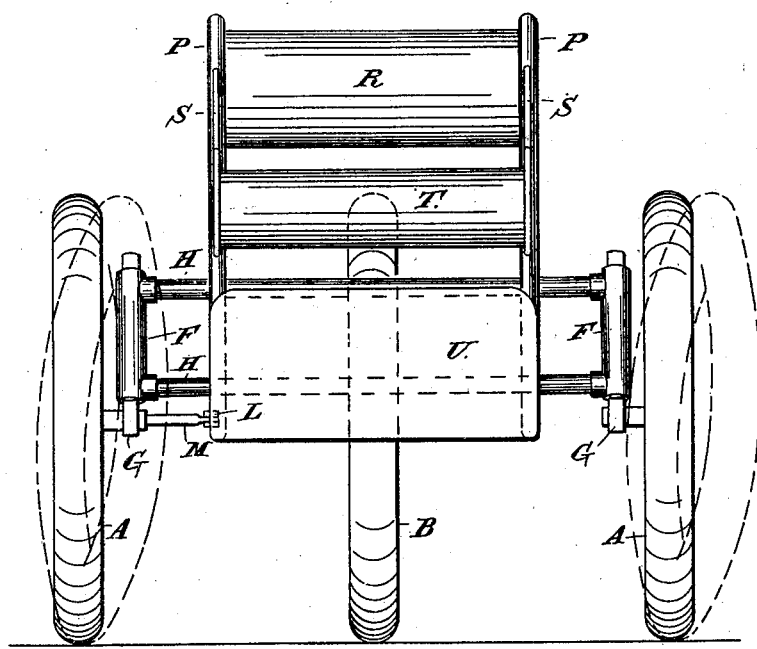
Figure 4:
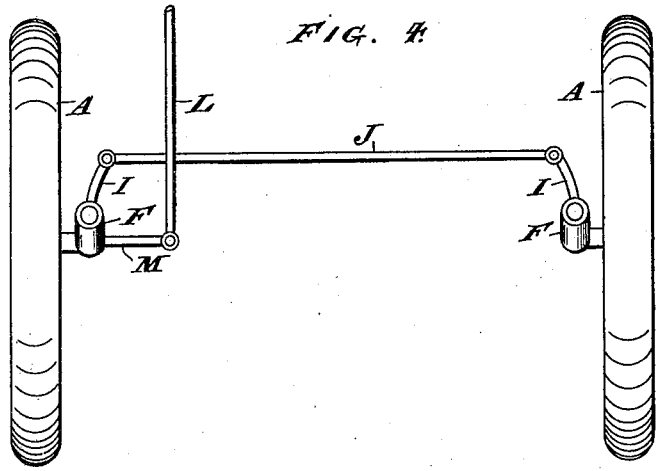

In the accompanying drawings, Figure 1 is a side view, Fig. 2 is a plan, and Fig. 3 is an end view, illustrating a motor-tricycle according to this invention. Fig. 4 is a plan of the steering arrangements.

The vehicle has two leading wheels A by which it is steered, and a trailing wheel B, which is the driving-wheel.

The main framework of the vehicle comprises two main tubes C C, which extend from front to rear and which are connected by two cross-tubes D E. The forward ends of the tubes C are inclined outwardly from the point where they are joined by the tube E, and on the extremities of these inclined ends are provided head-lugs or ball-heads F, which receive the steering-columns G, and from these steering-columns project the axles upon which the wheels A are mounted. The head lugs F are braced by the stays H. The secondary or seat frame comprises a pair of bent tubes P, supported upon springs Q, which are attached to the lower stay H and to the projecting ends of the cross-tube E. Carried by the upper part of this frame is a reservoir R, which contains oil or spirit for the engine, and secured to the seat-arms S is a second reservoir T. The seat proper is formed by upholstery carried on and suspended between these two reservoirs. Flexible tubing connects the engine N with the reservoir R and the reservoir R with the reservoir T. The contents of the reservoir T may be forced into the reservoir R by air compressed by a tire-inflater.

The steering-heads F are inclined backward, so that when the wheels A are steered to right or left they incline in the direction in which they are steered, as indicated by dotted lines in Fig. 3.

Projecting at right angles from the steering-columns are the axles of the wheels A, and at right angles to each axle is a lever $l$, the ends of the two levers $l$ being coupled by a rod J, so that both steering-columns turn together. The steering is effected by the lever K, which is connected by a rod L to the lever M, which extends inward from one of the axles.

The vehicle is driven by the engine N, the shaft of which drives a counter-shaft O, which is connected by differential speed-gear to the driving-wheel B, as shown in Figs. 1 and 2. The exhaust-gases of the engine pass into a receiver V and thence into the cross-tube E and ultimately escape by holes along the under sides of the main tubes C. A socket in the middle of the cross-tube D receives the inclined pillar-tube for the rear seat, and the top of this tube is connected by a pair of diagonal stays to the rear ends of the tubes C.

Having now described my invention, what I claim as new, and desire to secure by Letters Patent, is—

1. In combination a primary frame comprising the tubes C connected by cross-tubes D, E, and disposed parallel with each other from the rear wheel to the tube E from whence they diverge to the steering-heads F which are braced by stays H, a frame for the back seat being carried on the cross-tube D and on the rear ends of the tubes C, and a frame for the front seat comprising the tubes P, arms S, reservoirs R, T, said seat-frame being supported on springs carried on the cross-tube E and on one of the stays H, substantially as described.

2. The front seat-frame, consisting of a pair of bent tubes P having their upper ends attached to the reservoir R and linked to the upper ends of springs Q, and having their lower parts carried on the lower ends of the springs Q, a pair of seat-arms S attached to the tubes P and carrying a reservoir T which with the reservoir R supports the upholstery of the seat proper, substantially as described.

In witness whereof I have hereunto set my hand and affixed my seal in presence of two witnesses.

RALPH JACKSON. [L. S.]

Witnesses:
T. L. WILKINSON,
J. A. COUBROUGH.